(12) United States Patent
Zimmer et al.

(10) Patent No.: US 8,431,631 B2
(45) Date of Patent: Apr. 30, 2013

(54) AQUEOUS PIGMENTED YELLOW INKJET INK COMPOSITION

(75) Inventors: Agnes Zimmer, Lexington, KY (US); Rahel Bogale, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 38 days.

(21) Appl. No.: 13/250,190

(22) Filed: Sep. 30, 2011

(65) Prior Publication Data

US 2013/0085206 A1   Apr. 4, 2013

(51) Int. Cl.
  *C09D 11/10*   (2006.01)
(52) U.S. Cl.
  USPC .......................................... 523/160; 524/377
(58) Field of Classification Search .................. 524/377; 523/160, 161
  See application file for complete search history.

(56) References Cited

U.S. PATENT DOCUMENTS

| 6,225,370 | B1 | 5/2001 | Suthar |
| 6,538,049 | B1 | 3/2003 | Kappele |
| 6,638,350 | B2 | 10/2003 | Butler |
| 7,001,936 | B2 | 2/2006 | Akers, Jr. |
| 7,429,293 | B2 | 9/2008 | Cai |
| 7,682,434 | B2 | 3/2010 | Akers, Jr. |
| 7,923,191 | B2 | 4/2011 | Bertelsen |
| 2005/0187312 | A1 | 8/2005 | Akers, Jr. |
| 2007/0078199 | A1 | 4/2007 | Winkler |
| 2010/0016469 | A1 | 1/2010 | Bertelsen |
| 2010/0285219 | A1 | 11/2010 | Cai |

*Primary Examiner* — Vu A Nguyen

(57) ABSTRACT

The invention relates to an aqueous yellow inkjet ink composition for use in ink jet printers comprising an aqueous carrier, a yellow pigment, a polymeric dispersant, a surfactant, and a specific cosolvent mixture comprising a $C_2$-$C_8$ terminal alkanediol or a mixture thereof, a polyol/polyalkylene oxide condensate, a cyclic amide and its derivative, and a trihydric alcohol. The yellow inkjet ink demonstrates excellent stability, good maintenance characteristics and high heater reliability in permanent and semi permanent printheads. The ink also reduced post print paper curl without sacrificing print quality.

11 Claims, No Drawings

AQUEOUS PIGMENTED YELLOW INKJET INK COMPOSITION

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

Field of Disclosure

Ink jet printing is accomplished by ejecting ink from a nozzle toward paper or another print medium. The ink may be driven toward the medium in a variety of ways. For example, in electrostatic printing, the ink is driven from a nozzle toward a medium by an electrostatic field. Another ink jet printing procedure, known as squeeze tube, employs a piezoelectric element in the ink nozzle. Electrically-caused distortions of the piezoelectric element pump the ink through the nozzle and toward the print medium. In still another ink jet printing procedure, known as thermal or bubble ink jet printing, the ink is driven from the nozzle toward the print medium by the formation of an expanding vapor phase bubble in the nozzle. These various printing methods are described in "Output Hard Copy Devices," edited by Durbeck and Sherr, Academic Press, 1988 (see particularly chapter 13, entitled "Ink Jet Printing").

Ink jet printers are well known. One common type of ink jet printer uses a replaceable print cartridge having a printhead and a supply of ink contained within the cartridge. The printhead is installed in a printhead carrier, which positions the printhead along a printing zone. When the supply of ink contained within the print cartridge is depleted, the print cartridge is disposed of and a new print cartridge is installed in the printhead carrier. In contrast, off-carrier inkjet printers deliver ink through supply tubes connected from a refillable off-carrier ink supply tank to an ink jet printhead positioned on the printhead carrier. This inkjet printhead is not disposable but permanent or semi-permanent in nature. Naturally consumers expect that these permanent or semi-permanent printheads have a longer life compared to a disposable printhead. When the supply of ink is exhausted, the consumer will purchase a new tank filled with ink as opposed to purchasing a brand new printhead containing the same supply of ink. Purchasing a tank of ink is a more economical option for the consumer. Therefore it is imperative that a permanent or semi-permanent printhead does not fail in their operations prematurely because consumers expect that permanent and semi-permanent printheads will have a longer life compared to a disposable printhead.

Ink being jetted over the life of permanent or semi-permanent printheads can cause many problems which affect the overall performance of the printhead. One of the most common problems is kogation. During the millions of firing of drops of ink from the printhead, the layer of ink covering the surface of the heating element of the printhead can reach a very high temperature, usually over 300° C. At this high temperature, ink decomposes, thereby depositing a residue onto the surface of the heater. This phenomenon is called kogation. The presence of this residue negatively affects the volume, mass, shape and velocity of each ejected drop of ink jetted from the printhead, thereby reducing the quality and the expected life of a thermal inkjet printhead. A loss of drop mass over the life of the printhead negatively reduces the accuracy of drop placement onto the print media. In extreme cases, kogation causes the printhead to stop working altogether. Therefore, it is necessary to have an ink that does not cause the undesirable kogation in a printhead.

Another undesirable problem is paper curl. The use of water in high concentrations in inkjet ink formulations induces the water to negatively react with the paper, thereby causing the edges of the paper migrate towards the center of the paper. Curl may appear immediately after printing or it may take a couple of days to manifest itself. In its final state, the paper may curl so much that it resembles a roll, scroll or a tube. Curled paper cannot be stacked nor can it successfully be duplexed in a print job.

In order to reduce paper curl it is helpful to understand the mechanism of paper curl and determine which particular ink components have an effect on this paper curl. Media tends to curl after a large quantity of ink is deposited onto the surface of the printing substrate. Plain paper substrates are comprised mainly of cellulose fibers, along with varying levels of inorganic fillers. It is the interaction of the water in the inkjet inks with these cellulose fibers that leads to the phenomenon of paper curl. The absorption of water by the cellulose fibers causes swelling and then breaking of the interfiber cellulose bonds in the paper.

Upon drying there are differential stresses between the printed and non-printed surfaces. These differential stresses manifest themselves as paper curl, whereby the substrate tends to curl towards the surface from which moisture was last removed (the imaged surface). An ink formulation with a reduced level of water in addition to humectants with high boiling points effectively eliminates the typical end user problems of stacking and displaying printed images with unacceptable levels of paper curl.

Another important factor considered when formulating inks is idle time. Idle time is used to measure the short term reliability of an ink. Idle time is measured as the time between nozzle firings just before the printhead produces delayed or misdirected ink droplets. Often yellow inks exhibit poor idle times.

Ink formulations used in ink jet printers generally comprise deionized water, a water-soluble or water-miscible organic solvent, and a colorant. Generally, the colorant is a soluble dye. Unfortunately, inks comprising soluble dyes can exhibit many problems, such as poor water-fastness, poor light-fastness, clogging of the jetting channels as a result of solvent evaporation and changes in the dye's solubility, dye crystallization, poor print quality including ink bleeding and feathering, poor thermal stability, chemical instability, and ease of oxidation.

Many of these problems can be overcome by replacing the soluble dyes used in the ink formulations with insoluble pigments. In general, pigments have superior properties when compared to dyes, particularly in terms of water-fastness, light-fastness, thermal stability, oxidative stability, and compatibility with both coated/treated and plain papers. However, a new set of problems arises because the pigments are insoluble in the ink composition and must be present in the ink as a dispersion. Stability of the ink is critical, both in terms of maintaining uniformity of properties and assuring that the pigment does not clog the ink jets during long periods of idle in usage. The ideal, both for stability and cost reasons, of course, would be to utilize the minimum amount of pigment necessary in the ink composition. However, decreasing the amount of pigment in the ink compositions can lead to images having poor optical densities. Further, because of the compositional balancing required to assure the necessary stability, it is also important to assure that the composition has an appropriate viscosity for use in an ink jet printer, as well as good printing properties such as good water-fastness, light-fastness, and minimized running and feathering when applied to the paper. Appropriate viscosity is vital, especially when the ink is used in an off-carrier printer. Low viscosity is needed to increase the ink penetration and image drying speeds. Usually a desirably viscosity at 25 C is in the range of 2.5-3.0 cps. However, many solvents and antikogation agents negatively increase the viscosity of the ink. This causes great difficulty in jetting the ink, especially after the printhead is idle, and consequently leads to clogging of the printhead, difficulty in jetting the ink and ultimately to the printhead failing prematurely.

As discussed above, it has been very difficult to develop a yellow ink formulation which optimizes all of these desired ink printing properties simultaneously. Therefore, many trade-offs arise when trying to formulate an acceptable yellow ink formulation. Often the inclusion of an ink component meant to fix and or control one of the above discussed problems can prevent another printing property from being met. The general approach has been to balance and optimize these often competing properties. Thus, most yellow inks are a compromise in an attempt to achieve most of the above listed printing property requirements.

Prior to the present invention, however, an ink formulation which optimizes all of these desired ink printing properties had not been achieved. For example, increasing the pigment load in the inkjet ink formulation improves the optical density and gamut of the ink but it also has a negative impact on jetting and heater kogation. Many solvents help kogation but they negatively increase the viscosity of the ink which can lead to jetting failure in the printhead. Humectants (also termed cosolvents) can be added to the ink composition to aid in maintaining the colorant in the ink composition and to enhance the performance of the ink. However, often the addition of particular humectants can negatively impact the print quality of the ink. Unfortunately, high quantities of humectants adversely affect the yellow ink in terms of viscosity, dry time and smudging. Consequently, there is a need to balance these competing factors when deciding exactly which components to include and at what percentage each component should be used in a yellow ink formulation, wherein the ink formulation would minimize kogation and paper curl while still have acceptable print quality and print properties. The yellow inkjet ink of the present invention balances these many trade-offs to formulate an optimized yellow inkjet ink formulation. More particularly, additional development work done by the inventors has determined a particular group of cosolvents which reduce paper curl and kogation, maintain printhead function while still provide acceptable print quality.

It is believed that the yellow ink of the present invention uses a unique group of cosolvents which surprisingly produces an optimal ink formulation which minimize kogation and paper curl while still has acceptable print quality. With the increased usage of off carrier inkjet printing systems having permanent and semi-permanent printheads, this type of yellow inkjet ink formulation greatly needed.

It has now been discovered that the use of a very specific cosolvent mixture containing: 1) a terminal $C_2$-$C_8$ terminal alkanediol; 2) a polyol/alkylene oxide condensate; 3) a trihydric alcohol; and 4) a cyclic amide and its derivative in an aqueous inkjet ink composition containing a dispersion of an insoluble yellow pigment provides a unique blend of optimized properties needed and desired for a yellow pigmented ink. Specifically, this yellow ink composition provides excellent printing properties in terms of stability, optical density (even when low levels of pigment are utilized), viscosity, paper curl, printing characteristics (water-fastness, minimized feathering, minimized running of ink on the printed page), and printer maintenance problems (i.e., minimized clogging of the printhead during gaps in printer usage). The inventors are not aware of any prior art that describes or suggests the specific cosolvent combinations of the present invention.

It is, therefore, an object of the present invention to provide an improved yellow pigmented ink composition for ink jet printers having very specific cosolvent system which produces an inkjet ink having optimal printing properties while simultaneously reducing paper curl and kogation and improving idle times. The yellow inkjet ink of the present invention is especially suitable for use in permanent or semi permanent printheads. Other objects and advantages of the present invention will become apparent from the following disclosure.

SUMMARY OF THE INVENTION

The present invention relates to an aqueous ink composition suitable for use in ink jet printers comprising:
(a) from about 1.0% to about 5.0% of an insoluble yellow pigment;
(b) from about 0.5% to about 2.0% of a polymeric dispersant for the yellow pigment;
(c) from about 0.1% to about 3% of a surfactant;
(d) from about 15.0% to about 25.0% of a cosolvent mixture comprising
  (1) a $C_2$ to $C_8$ terminal alkanediol;
  (2) a trihydric alcohol;
  (3) a polyol/alkylene oxide condensate having the formula

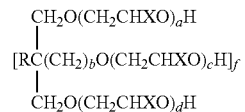

wherein X is H or $C_1$-$C_6$ alkyl, R is H, $C_1$-$C_6$ alkyl or $CH_2O(CH_2CH_2O)_eH$, b is 0 or 1, a+d+f(c+e) is from about 2 to about 100,
and f is from about 1 to about 6;
  (4) a cyclic amide and its derivative; and
(e) the balance an aqueous carrier.

The weight ratio of the yellow pigment to the polymeric dispersant is 3:1 to 5:1, preferably 3.5:1. Optionally, the yellow inkjet ink of the present invention may contain a biocide. All percentages used herein are "by weight" unless otherwise specified and are based on the overall yellow inkjet ink composition. All molecular weights, used herein, are number average molecular weights unless otherwise specified. A $C_2$-$C_8$ terminal alkanediol is defined to mean a diol having hydroxyl groups at each end like, for example, an alkanediol having the formula:

wherein t is about 0 to about 6.

DETAILED DESCRIPTION OF THE INVENTION

The present invention relates to aqueous yellow ink compositions suitable for use in ink jet printers. These compositions contain a colorant such as an insoluble yellow pigment, a polymeric dispersant for the pigment (the pigment and the dispersant being present in the composition as a dispersion), an aqueous carrier, a surfactant, an optional biocide and a unique cosolvent mixture. Each of these required components will be described in detail below.

The first component of the ink composition of the present invention is the yellow pigment, an insoluble colorant. The yellow pigment is present in the inkjet ink composition of the present invention at from about 1.0% to about 5.0%, most preferably about 4.0% of the total yellow inkjet ink composition. Indeed, one of the important advantages of the present invention is that it allows formulation of inks having low levels of pigment (e.g., between 0.5% and 5.0%) while still providing print of high quality and excellent optical density. The pigments useful in the present invention are any of the conventional pigments known in the art.

The pigment particles should be sufficiently small to permit free flow of the ink through the ink jet printing device, especially at the ejecting nozzles which usually have a diameter ranging from about 10 microns to about 100 microns. The particle size also has an influence on the pigment dispersion stability, which is critical throughout the life of the ink. Brownian motion of minute particles will help prevent the particles from flocculation, thereby providing a more stable product. It is also desirable to use small particles for maximum color strength and gloss. The range of useful particle size is from about 0.05 microns to about 15 microns. Preferably, the pigment particle size ranges from about 0.05 micron to about 5 microns and, most preferably, from about 0.05 micron to about 1 micron. The pigments may be used in dry or wet form. For example, pigments are usually manufactured in aqueous media and the resulting pigment is obtained as water wet presscake. In presscake form, the pigment is not agglomerated to the extent that it is in dry form. Thus, pigments in water wet presscake form do not require as much defloculation in the process of preparing the inks as do dry pigments.

Examples of commercially available yellow pigments which may be used in the present invention include the following: PY74, PY95, PY110, PY114, PY128 and PY155, L75-2377 Yellow (Sun Chem.), L74-1357 Yellow (Sun Chem.), Hostaperm® Yellow H4G (Hoechst), Irgazin® Yellow 5GT (Ciba-Geigy), Permanent Yellow G3R-01 (Hoechst), Novoperm® Yellow FGL (Hoechst), Chromophthal® Yellow 3G (Ciba-Geigy), Hansa Yellow X (Hoechst), Dalamar® Yellow YT-858-D (Heubach), and Hansa Brilliant Yellow 5GX-02 (Hoechst).

A polymer dispersant is used to disperse the insoluble yellow pigment. Polymeric dispersants suitable for use in the present invention include any of the anionic, cationic or non-ionic polymers known in the art as suitable for use as dispersants in ink jet ink preparations. The pigment dispersion should contain enough dispersant to stabilize the pigment particles in water, but not so much as to adversely affect properties of the ink such as viscosity, stability and optical density. The yellow ink composition of the present invention contains a polymer dispersant in the amount from about 0.5% to about 2%, most preferably about 0.9%, based on the overall total weight of the yellow inkjet ink composition. The ratio of the aforementioned yellow pigment to the polymer dispersant is 3:1 to 5:1, most preferably 3.5:1.

The polymeric dispersant is a graft co-polymer, preferably a ter-polymer made by a free radical polymerization process. It preferably contains three monomers: namely a hydrophilic component, a hydrophobic component and a protective colloid component. The ratio of the three monomers can vary. The preferred ratio of the hydrophilic component:the hydrophobic component:the protective colloid component can range from 5:1:1 to 40:2:1, preferably 15:1:1, most preferably, 6:1:1. This polymer dispersant and its polymerization is more particularly described in U.S. Pat. Nos. 6,652,634 and 7,429,102 assigned to the assignee of the present invention.

The hydrophilic component of the polymeric dispersant is preferably an ionic monomer component which may be selected from acrylic acid, methacrylic acid, crotonic acid, or other acid containing monomers. The hydrophilic component preferably provides polymeric dispersant electron static stability. Particularly preferred is a methacrylic acid (MAA) polymer, or a copolymer thereof.

The hydrophobic component of the polymeric dispersant preferably contains electron rich functional groups. Such functional groups exhibit strong interaction or adsorption properties with respect to epoxy molecules. Preferred groups that provide the electron rich functional groups include nonylphenyl, mono-, di-, and tri-styrene phenyl, polydimethylsiloxy, stearyl, and fluoronated hydrocarbon containing groups. Examples of such monomers include, but are not limited to, polymerizable monofunctional vinyl monomers from Toagosei Co. of Tokyo, Japan under the trade name ARONIX M-117, mono-methacryloxypropyl terminated polydimethylsiloxane from Gelest, Inc. of Morrisville, Pa. under the trade name MCR-M11, and polydimethylsiloxane-co-polypropylene glycol methacrylate from Chisso Corporation of Tokyo, Japan. Non-siloxyl hydrophobic monomers may be derived from long chain aliphatic groups, long chain alcohols, and alkyl aryl alcohols. Examples of such materials preferably include stearyl or lauryl acrylate or methacrylate or nonyl phenol acrylate or methacrylate. The most preferred hydrophobic component is polypropylene glycol nonylphenylether acrylate (Aronix M-117).

Another important component of the polymeric dispersant is the protective colloid component. This component provides extra stability to the ter-polymer in an aqueous system. Use of this component substantially reduces the amount of ionic monomer component needed, thereby increasing the non-ionic water solubility of the polymeric dispersant. The protective colloid component may be selected from either a reactive surfactant or a protective colloid macromer material.

Examples of reactive surfactants include, but are not limited to, nonylphenoxy poly(ethyleneoxy) acrylate (containing from 1 to about 40 moles of ethylene oxide), nonylphenoxy poly(ethyleneoxy)methacrylate (containing from 1 to about 40 moles of ethylene oxide),), Tristyrenenated phenoxy poly(ethyleneoxy)methacrylate (containing from 1 to about 40 moles of ethylene oxide), nonylphenoxy poly(ethyleneoxy) crotonate (containing from about 5 to about 40 moles of ethylene oxide), bis-nonylphenoxy poly(ethyleneoxy) fumarate (containing from about 5 to about 40 moles of ethylene oxide), phenoxy-poly(ethyleneoxy) acrylate (containing from about 5 to about 40 moles of ethylene oxide), perfluoroheptoxypoly (propyloxy) acrylate, perfluoroheptoxypoly (propyloxy)methacrylate, sorbitol acrylate, sorbitol methacrylate, and allyl methoxy triethylene glycol ether, alkyloxy poly(ethyleneglycol)methacrylate.

Preferred protective colloid or reactive surfactant components include nonylphenoxy PEG-10 methacrylate, trimethylsiloxy-terminated PEG 4-5 methacrylate, where PEG is polyethylene glycol. Particularly preferred protective colloid materials are derived from nonlyphenyl polyethylene glycol methacrylate, mono-, di-, and tri-styrenated phenyl polyethylene glycol methacrylate, and stearyloxy polyethylene glycol ether methacrylate. The most preferred protective colloid component includes poly (ethylene glycol) 2,4,6-tris-(1-phenylethyl)phenyl ether methacrylate (Sipomer SEM-25) and its di and mono derivatives wherein the alkylene group contains from 3 to 10 carbon atoms. This type of monomer is commercially available from Rhodia, USA of Cranbury, N.J. under the trade name SIPOMER/SEM 25.

A particularly useful polymer dispersant available from Lexmark International®, Inc. is an acrylic terpolymer having moieties of methacrylic acid (MAA); polypropylene glycol nonylphenylether acrylate (Aronix M-117); and poly (ethylene glycol)2,4,6-tris-(1-phenylethyl)phenyl ether methacrylate (Sipomer SEM-25). In exemplary embodiments, the molar ratio of MAA:Aronix M-117:Sipomer SEM-25 ranges from 5:1:1 to 40:2:1. In the most preferred embodiment, the molar range of the MAA:Aronix M-117:Sipomer SEM-25 is 6:1:1. Alternatively, the ratio of MAA:Aronix M-117:Sipomer SEM-25 is 15:1:1. This polymer dispersant and its polymerization is more particularly described in U.S. Pat. Nos. 6,652,634 and 7,429,102 assigned to the assignee of the present invention.

Another useful polymer dispersant is a graft polymer having both an anionic hydrophilic monomer and a hydrophobic aromatic monomer. The hydrophilic monomer can be any carboxylic acid containing vinyl, acrylic or methacrylic molecule which is typically used in radical polymerization. Examples are methacrylic acid or acrylic acid. The hydrophobic monomer can be any phenyl containing monomer of the type including acrylic, methacrylic, vinyl or styrene that is typically used in radical polymerization. An exemplary polymer dispersant of this type is a copolymer manufactured by Lexmark International®, Inc. using methacrylic acid for the hydrophilic component and benzyl methacrylate for the hydrophobic component. The molar ratio of the methacrylic acid to the benzyl methacrylate is 1:1. Another useful polymer dispersant is a terpolymer using styrene and alpha-methyl styrene in the hydrophobic component and acrylic acid in the hydrophilic component of the terpolymer. This terpolymer is sold by BASF Company under the trade name Joncryl® HPD 471. Another useful polymer dispersant, manufactured by Lexmark International®, Inc. is described in U.S. Pat. Nos. 5,714,538 and 5,719,204 assigned to the assignee of this invention.

The third component of the yellow inkjet ink composition is a surfactant added to adjust the surface tension of the ink. The surfactant can be anionic, or nonionic. The surfactant is present at a level of about 0.5% to about 2.0%, most preferably about 0.8%, based on the overall total weight of the yellow inkjet ink composition. Suitable surfactants include, but are not limited to those of the Triton® and Tergitol®series (Dupont Company); those of the Surfynol® series and Dynol Series® (Air Products Inc.); and those of the Iconol® series (BASF Co.). The most preferred surfactant is ethoxylated 2,4,7,9-tetramethyl-5-decyn-4,7-diol sold under the trade name Surfynol® 465. Other desired chemical additives such as biocides, ph buffers, chealating agents (EDTA) and the like can also be optionally used in the yellow ink of the present invention.

The forth component for use in the yellow inkjet ink composition of the present invention is the unique cosolvent mixture, present in the amount of about 15.0% to about 25.0%, most preferably about 19% based on the overall total weight of the yellow inkjet ink composition.

This cosolvent mixture contains a first component comprising one $C_2$-$C_8$, terminal alkanediol. Suitable terminal alkanediols include 1,3-propanediol, 1,4-butanediol, 1,5-pentanediol, 1,6-hexanediol, 1,7-heptanediol and mixtures thereof. The most preferred terminal alkanediol is 1,3-propanediol. The amount of the terminal alkanediol to be used is from 5% to 15%, most preferably about 9%, based on the total weight of the yellow inkjet ink composition.

The second component used in this cosolvent mixture is a trihydric alcohol. Some examples of trihydric alcohols include glycerol and trimethylolpropane. Various tests indicate that a mixing of trihydric alcohols has an adverse effect on jetting. Glycerol is the most preferred trihydric alcohol. The amount of the trihydric alcohol to be used is from 1% to 5%, most preferably about 3%, based on the total weight of the yellow inkjet ink composition.

The third component in the cosolvent mixture is a polyol/alkylene oxide condensate having the formula:

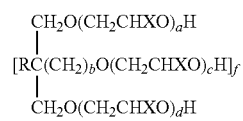

wherein X is H or $CH_3$, R is H, $C_1$-$C_4$ alkyl or —$CH_2O$ $(CH_2CH_2O)_e$H, b is 0 or 1, a+d+f (c+e) is from about 2 to about 100, and f is from about 1 to about 6.

The polyol/alkylene oxide condensate compounds useful in the present invention are reaction products of a polyol and an alkylene oxide. They are described in U.S. Pat. No. 5,180, 425, Matrick, et al., issued Jan. 19, 1993, incorporated hereby by reference. These compounds generally have solubility in water of at least about 4.5% (i.e., 4.5 parts in 100 parts of water) at 25° C. The alkylene oxide used in these compounds is either ethylene oxide or propylene oxide or combinations of both oxides. Reaction with a single alkylene oxide can produce mixtures of compounds with varying degrees of oxyalkylation so that the structures illustrated are based on average compositions which may contain a range of alkylene oxide units. Random and block copolymer chains of propylene and ethylene oxides may be employed. The polyol reacted with the alkylene oxide may contain three or more hydroxyl groups. Useful triols are glycerol, trimethylol propane, and trimethylol ethane. Others, such as 1,2,4-butanetriol and 1,2,6-hexanetriol may also be used. Pentaerythritol, di-(trimethylol propane), and methyl glucosides are among the useful tetrols. Glucose, a pentol, may be used. Sorbitol is a useful hexyl. Other useful hexyls include dipentaerythritol and inositol. Alkylene oxide condensates of diols are not generally suitable for use in the present invention because such condensates are generally not compatible with pigment dispersions. One exception may be alkylene oxide condensates of neopentyl glycol.

Some examples of polyol/alkylene oxide condensates are as follows:

| Product | R | a + d + f (c + e) | b | f |
|---|---|---|---|---|
| Liponic ® EG-1[1] | —H | 26 | 0 | 1 |
| Liponic ® SO-20[1] | —H | 20 | 0 | 4 |
| Photonol ® PHO-7149[2] | —$C_2H_5$ | 2.7 | 1 | 1 |
| Photonol ® PHO-7155[2] | —$C_2H_5$ | 7.4 | 1 | 1 |
| Voranol ® 230-660[3] | —$CH_3$ | 3.0 | 1 | 1 |
| Voranol ® 234-630[3] | —$C_2H_5$ | 3.0 | 1 | 1 |
| Fomrez ® T-279[4] | —$C_2H_5$ | 3.1 | 1 | 1 |

-continued

| | a + d + f | | | |
|---|---|---|---|---|
| Product | R | (c + e) | b | f |
| Fomrez ® T-315[4] | —C$_2$H$_5$ | 4.1 | 1 | 1 |
| Polyol ® 3165[5] | —C$_2$H$_5$ | 20 | 1 | 1 |

[1]Lipo Chemicals Co., Paterson, N.J.
[2]Henkel Corp., Ambler, PA
[3]Dow Chemical Co., Midland, MI
[4]Witco Corp., Organic Division, New York, NY
[5]Perstop Chemicals, Inc., Patterson, NJ A particularly preferred polyol/alkylene oxide condensate for use in the present invention is Polyol® 3165, described above. The amount of the polyol/alkylene to be used is from 0.5% to 4%, most preferably about 1%, based on the total weight of the yellow inkjet ink composition.

The fourth component of the unique cosolvent mixture is a cyclic amid compound such as cyclic amides, substituted cyclic amides and cyclic amide derivatives. The cyclic amide compound may be selected from the group consisting of 2-pyrrolidone, 1-methyl-2-pyrrolidine, 1,5-dimethyl-pyrrolidone, 1-ethyl-2-pyrrolidone, 1-propyl-2-pyrrolidone, 1-isopropyl-2 pyrrolidone, 1-butyl-2-pyrrolidone, 1-(2-hydroxyethyl)-2-pyrrolidone 1-methyl-2-piperidone, 1-methylcaprolactum, oenantholactum, and mixtures thereof. The most preferred cyclic amide compound is 1-(2-hydroxyethyl)-2-pyrrolidone. The amount of the cyclic amide compound to be used is from 5% to 10%, most preferably about 6%, based on the total weight of the yellow inkjet ink composition.

The balance of the yellow inkjet ink of the present invention is an aqueous carrier medium, usually water, preferably deionized water. The yellow inkjet ink formulation may optionally contain a biocide.

The yellow ink composition of the present invention may be prepared by any method known in the art for making such compositions. In one embodiment, the ink is first prepared by mixing the pigment, dispersant and deionized water together in an attritor to form a concentrate. Alternatively, commercially available yellow pigment dispersions using the above described polymer dispersants can be purchased from various manufacturers. If the commercially available pigment dispersion is used, the weight ratio of the yellow pigment to the polymeric dispersant is 3:1 to 5:1, preferably 3.5:1. The ink is then prepared by combining with deionized water and the additional components such as the unique cosolvent mixture, surfactants, biocides, and optional additives at their art-established levels to achieve their art-known benefits.

The following examples are detailed descriptions of methods of preparation and use of the ink compositions of the present invention. The detailed descriptions fall within the scope of, and serve to exemplify, the more general description set forth above. The examples are presented for illustrative purposes only, and are not intended as a restriction on the scope of the invention.

Yellow ink compositions comprising the unique cosolvent mixture in accordance with the present invention demonstrate optimal printing properties while simultaneously reducing paper curl and kogation and improving idle times. An inventive yellow inkjet composition in accordance with the present invention is formulated as follows:

TABLE 1

EXAMPLE YELLOW INKJET INK FORMULATIONS

| Ink | Ingredient | Quality (Weight %) |
|---|---|---|
| Ink 1 | PY74 | 4.0 |
| | Polymer Dispersant | .9 |
| | 1,3-propanediol | 9.5 |
| | Glycerol | 9.5 |
| | Surfynol 465 | 0.8 |
| | Kordek MLX | 0.15 |
| | Deionized water | Balance |
| Ink 2 | PY74 | 4.0 |
| | Polymer Dispersant | .9 |
| | 1-(2hydroxethyl)-2-Pyrrolidone | 9.5 |
| | Polyol 3165 | 9.5 |
| | Surfynol 465 | 0.8 |
| | Kordek MLX | 0.15 |
| | Deionized water | Balance |
| Ink 3 | PY74 | 4.0 |
| | Polymer Dispersant | .9 |
| | 1,3-propanediol | 9.5 |
| | Polyol 3165 | 9.5 |
| | Surfynol 465 | 0.8 |
| | Kordek MLX | 0.15 |
| | Deionized water | Balance |
| Ink 4 | PY74 | 4.0 |
| | Polymer Dispersant | .9 |
| | 1,3-propanediol | 9.5 |
| | 1-(2hydroxethyl)-2-Pyrrolidone | 9.5 |
| | Surfynol 465 | 0.8 |
| | Kordek MLX | 0.15 |
| | Deionized water | Balance |
| Ink 5 | PY74 | 4.0 |
| | Polymer Dispersant | .9 |
| | Glycerol | 9.5 |
| | Polyol 3165 | 9.5 |
| | Surfynol 465 | 0.8 |
| | Kordek MLX | 0.15 |
| | Deionized water | Balance |
| Ink 6 | PY74 | 4.0 |
| | Polymer Dispersant | .9 |
| | 1,3-propanediol | 12.0 |
| | 1-(2hydroxethyl)-2-Pyrrolidone | 6.0 |
| | Polyol 3165 | 1.0 |
| | Surfynol 465 | 0.8 |
| | Kordek MLX | 0.15 |
| | Deionized water | Balance |
| Ink 7 | PY74 | 4.0 |
| | Polymer Dispersant | .9 |
| | 1,3-propanediol | 11.0 |
| | Glycerol | 1.0 |
| | 1-(2hydroxethyl)-2-Pyrrolidone | 6.0 |
| | Polyol 3165 | 1.0 |
| | Surfynol 465 | 0.8 |
| | Kordek MLX | 0.15 |
| | Deionized water | Balance |
| Ink 8 | PY74 | 4.0 |
| | Polymer Dispersant | .9 |
| | 1,3-propanediol | 9.0 |
| | Glycerol | 3.0 |
| | 1-(2hydroxethyl)-2-Pyrrolidone | 6.0 |
| | Polyol 3165 | 1.0 |
| | Surfynol 465 | 0.8 |
| | Kordek MLX | 0.15 |
| | Deionized water | Balance |
| Ink 9 | PY74 | 4.0 |
| | Polymer Dispersant | .9 |
| | 1,3-propanediol | 11.0 |
| | 1-(2hydroxethyl)-2-Pyrrolidone | 6.0 |
| | Polyol 3165 | 1.0 |
| | Trimethylolpropane | 1.0 |
| | Surfynol 465 | 0.8 |
| | Kordek MLX | 0.15 |
| | Deionized water | Balance |

The inks prepared in Table 1 were tested for their performance in 5 different categories and Tables 2 and 3 lists the results of these tests. The first category tested was 'Idle Time' which is measured as the maximum time for a nozzle to idle before failing and producing a print quality defect. Higher numbers are desired for idle time. Idle time affects the maintenance algorithm of the printer which in turn affects throughput and how much ink will be used during the maintenance of the printhead.

The second category tested was 'Uncap Startup'. A rating of 'Poor' in the Uncap Startup test means that more than 50% of the nozzles are plugged with dried ink, thereby making it more difficult to recover or clear the nozzles with ink purging. A rating of 'Good' in the Uncap Startup test means that less than 0.5% of the nozzles are missing or plugged with dried ink, thereby making it easy to recover or clear the nozzles with ink purging. A rating of 'Average' in the Uncap Startup test means that more than 50% of the nozzles are plugged with dried ink but it is easy to unclog the nozzles by purging with fresh ink. As can be seen from Table 2, inks number 7, 8 and 9 formulated with the unique cosolvent mixture pass the Uncap Startup test.

A third category tested is 'Million Fires'. The Million Fires test is measured as the maximum number of million fires before the nozzle fails and consequently produces a print quality defect Million Fires is also a way to quantify the lifetime of a thermal printhead. Higher numbers are desired for the Million Fires test. As can be seen from Table 2, inks number 7, 8 and 9 formulated with the unique cosolvent mixture pass the Million Fires test (reaching 200 MF without printhead failure) thereby extending the life of the printhead.

The forth test was a measure of the viscosity of the inks. Appropriate viscosity is vital, especially when the ink is used in an off-carrier printer. Low viscosity is needed to increase the ink penetration and image drying speeds. Usually a desirably viscosity at 25 C is in the range of 2.5-3.0 cps. As can be seen from Table 2, inks number 7, 8 and 9 formulated with the unique cosolvent mixture exhibit a desirable viscosity.

TABLE 2

| Ink | Idle Time (sec) (60 F./8 % RH) | Uncap Startup (60 F.8% RH) | Million Fires (# of Million Fires MF) | Ink Viscosity @ 25 C. (cps) |
|---|---|---|---|---|
| Ink 1 | 3.6 | Average | 70 MF | 2.88 |
| Ink 2 | 1.2 | Poor | 200 MF | 3.55 |
| Ink 3 | 1.4 | Poor | 200 MF | 3.47 |
| Ink 4 | 3.7 | Poor | 80 MF | 2.60 |
| Ink 5 | 1.0 | Poor | 200 MF | 3.44 |
| Ink 6 | 3.8 | Poor | 200 MF | 2.55 |
| Ink 7 | 3.9 | Good | 200 MF | 2.54 |
| Ink 8 | 4.0 | Good | 200 MF | 2.76 |
| Ink 9 | 3.9 | Good | 200 MF | 2.56 |

As indicated by Table 2, ink compositions number 7, 8 and 9 having the unique cosolvent mixture of the present invention exhibit optimal printing properties and idle times while also reducing clogging and extending the life of the printhead. The yellow inkjet ink of the present invention is especially suitable for use in permanent or semi permanent printheads.

The fifth test performed was 'Paper Curl'. Paper curl occurs when the fibers within a sheet of paper expand or contract unevenly as the ink dries. This uneven shrinkage or expansion produces a bent or curled paper structure. Ink formulation is one of the most important variables of paper curl. The paper curl experiment began by studying two important factors: the print out of the image on the paper and the type of paper involved (plain, color-locked and recycled). The testing of paper curl determined that the worst and consistent curl was found on the Hammer Mill® Laser Print paper having a heavy coverage image printed thereon. Ink 1 having the unique cosolvent mixture was tested for paper curl against Ink 8. The result of this test is reported in Table 3 below. Lower curl numbers in millimeters are desired. Results show that Ink 8 having the unique cosolvent mixture had a reduction in paper curl by almost 50% when compared to Ink 1.

TABLE 3

| TIME (minutes) | INK 1 CURL (mm) | INK 8 CURL (mm) |
|---|---|---|
| 1 | 1.8 | 0.6 |
| 5 | 5.3 | 1.7 |
| 15 | 7.7 | 5.0 |
| 30 | 8.9 | 6.4 |
| 40 | 10.1 | 6.9 |
| 220 | 16.0 | 8.3 |

What is claimed is:

1. An aqueous yellow inkjet ink composition for use in ink jet printers comprising:
    (a) from about 1.0% to about 5.0% by weight, based on the total weight of the yellow inkjet ink composition, of an insoluble yellow pigment;
    (b) from about 0.5% to about 2.0% by weight, based on the total weight of the yellow inkjet ink composition, of a polymeric dispersant for said insoluble yellow pigment;
    (c) from about 0.1% to about 3% by weight, based on the total weight of the yellow inkjet ink composition, of a surfactant;
    (d) from about 15.0% to about 25.0% by weight, based on the total weight of the yellow inkjet ink composition, of a cosolvent mixture having:
        (1) a $C_2$-$C_8$ terminal alkanediol or a mixture thereof;
        (2) a polyol/polyalkylene oxide condensate having the formula

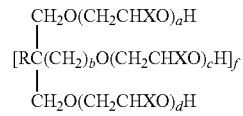

wherein X is H or $C_1$-$C_6$ alkyl, R is H, $C_1$-$C_6$ alkyl or $CH_2O(CH_2CH_2O)_eH$, b is 0 or 1, a+d+f (c+e) is from about 2 to about 100, and f is from about 1 to about 6;
        (3) a cyclic amide or its derivative;
        (4) a trihydric alcohol; and
    (e) the balance an aqueous carrier,
wherein the ink has excellent print quality, idle times, and long heater reliability.

2. The aqueous yellow inkjet ink composition according to claim 1 wherein the cosolvent mixture comprises:
    (1) 1,3-propanediol present in the amount of about 9.0%, based on the total weight of the yellow inkjet ink composition;
    (2) polyol/alkylene oxide condensate wherein X is hydrogen, R is $C_2H_5$, b is 1, f is 1, and a+d+f (c+e) is 20, present in the amount of about 1.0%, based on the total weight of the yellow inkjet ink composition;
    (3) 1-(2-hydroxyethyl)-2-pyrrolidone present in the amount of about 6.0%, based on the total weight of the yellow inkjet ink composition; and
    (4) glycerol present in the amount of about 3.0%, based on the total weight of the yellow inkjet ink composition.

3. The aqueous yellow inkjet ink composition of claim 1 wherein the surfactant is ethoxylated 2,4,7,9-tetramethyl-5-decyn-4,7-diol and is present in the amount of about 0.8%, based on the total weight of the yellow inkjet ink composition.

4. The aqueous yellow inkjet ink composition of claim 1 wherein the yellow pigment is present in the amount of about 4%, based on the total weight of the yellow inkjet ink composition.

5. The aqueous yellow inkjet ink composition of claim 1 wherein the polymer dispersant is present in the amount of about 0.9%, based on the total weight of the yellow inkjet ink composition.

6. The aqueous yellow inkjet ink composition of claim 1 wherein the polymer dispersant contains at least three components: a hydrophilic polymeric component, a hydrophobic polymeric component, and a protective colloid component.

7. The aqueous yellow inkjet ink composition of claim 6 wherein hydrophilic component is methacrylic acid, the hydrophobic component is polypropylene glycol nonylphenylether acrylate and the protective colloid component is poly(ethylene glycol)-2,4,6-tris-(1-phenylethyl)phenyl-methacylate.

8. The aqueous yellow inkjet ink composition of claim 7 wherein molar ratio of the methacrylic acid to the polypropylene glycol nonylphenylether acrylate to the poly(ethylene glycol)-2,4,6-tris-(1-phenylethyl)phenyl-methacrylate is 6:1:1.

9. The aqueous yellow inkjet ink composition of claim 7 wherein molar ratio of the methacrylic acid to the polypropylene glycol nonylphenylether acrylate to the poly(ethylene glycol)-2,4,6-tris-(1-phenylethyl)phenyl-methacrylate is 15:1:1.

10. The aqueous yellow inkjet ink composition of claim 1 further comprising a biocide.

11. The aqueous yellow inkjet ink composition according to claim 1 wherein the cosolvent mixture comprises:
(1) 1,3-propanediol present in the amount of about 11.0%, based on the total weight of the yellow inkjet ink composition;
(2) polyol/alkylene oxide condensate wherein X is hydrogen, R is $C_2H$, b is 1, f is 1, and a+d+f(c+e) is 20, present in the amount of about 1.0%, based on the total weight of the yellow inkjet ink composition;
(3) 1-(2-hydroxyethyl)-2-pyrrolidone present in the amount of about 6.0%, based on the total weight of the yellow inkjet ink composition; and
(4) trimethylolpropane present in the amount of about 1.0%, based on the total weight of the yellow inkjet ink composition.

* * * * *